(12) United States Patent
Schmitt et al.

(10) Patent No.: US 12,281,900 B2
(45) Date of Patent: Apr. 22, 2025

(54) DATA FEATURES INTEGRATION PIPELINE

(71) Applicant: Caret Holdings, Inc., Columbus, OH (US)

(72) Inventors: Kyle Patrick Schmitt, Chicago, IL (US); Joseph Allan Plattenburg, Columbus, OH (US); Christopher Mark Leight, Dublin, OH (US)

(73) Assignee: CARET HOLDINGS, INC., Columbus, OH (US)

( * ) Notice: Subject to any disclaimer, the term of this patent is extended or adjusted under 35 U.S.C. 154(b) by 273 days.

(21) Appl. No.: 17/935,890

(22) Filed: Sep. 27, 2022

(65) Prior Publication Data

US 2024/0102807 A1    Mar. 28, 2024

(51) Int. Cl.
*G01C 21/18* (2006.01)

(52) U.S. Cl.
CPC ..................... *G01C 21/18* (2013.01)

(58) Field of Classification Search
CPC ................ G01C 21/18; B60W 40/09
See application file for complete search history.

(56) References Cited

U.S. PATENT DOCUMENTS

| | | | | |
|---|---|---|---|---|
| 11,715,051 | B1* | 8/2023 | Baskaran | G06F 16/90335 |
| | | | | 707/758 |
| 2018/0075163 | A1* | 3/2018 | Park | G06F 16/248 |
| 2020/0394455 | A1* | 12/2020 | Lee | G06N 20/00 |
| 2021/0134147 | A1* | 5/2021 | Camplejohn | G07C 5/008 |
| 2021/0295614 | A1* | 9/2021 | Camplejohn | G06F 16/254 |
| 2022/0043807 | A1* | 2/2022 | Dwivedi | G06F 16/2379 |
| 2022/0111865 | A1* | 4/2022 | Lawrence | B60W 60/001 |
| 2022/0221281 | A1* | 7/2022 | Millington | G08G 1/0112 |
| 2023/0119881 | A1* | 4/2023 | Makhija | G06V 30/19147 |
| | | | | 705/28 |
| 2023/0126317 | A1* | 4/2023 | Millington | G01C 21/30 |
| | | | | 701/519 |
| 2023/0128788 | A1* | 4/2023 | Millington | G01C 21/3605 |
| | | | | 701/533 |

* cited by examiner

*Primary Examiner* — Rami Khatib
(74) *Attorney, Agent, or Firm* — SCHWEGMAN LUNDBERG & WOESSNER, P.A.

(57) ABSTRACT

Raw sensor data from a device of a user is collected. Trips from the sensor data are identified as raw trip data. Metadata for the trips is identified, linked to the trips, and maintained separately from the trip data. The trips are staged, and the corresponding trip data normalized when obtained from a storage or memory location. Normalized trip data is piped or made accessible to feature enhancing applications (apps), each app associating one or more features and events with a given trip. The features and events are maintained for the trips in event and feature level of detail tables. The tables are processed by consuming apps for purposes of updating user-level attributes associated with the user. In an embodiment, custom apps process the raw trip data to add additional features and events, which are directly integrated and updated in the tables for access by the consuming apps.

19 Claims, 4 Drawing Sheets

DATA FEATURES INTEGRATION PIPELINE

Data collection is omnipresent today as nearly every device collects data and applications that provide services to users collect a variety of data. For example, mobile phones have a variety of sensors such as accelerometers, gyroscopes, Global Positioning Satellite (GPS) receivers, wireless transceivers, compasses, cameras, microphones, etc. Each of these sensors produce data frequently captured in logs and/or cache of the phones.

The sensor data can be quite voluminous and is largely unstructured such that to use the data in any practical application requires significant resources to parse the data, tag the data, evaluate the data, and retain information discovered from data evaluation. Frequently, network service providers provide services to users over a wireless connection via mobile applications (apps) on their phones. Some of these services rely on sensor data provided by the apps for the services that they provided to their users.

Unfortunately, the workflows these services rely on require multiple passes on the raw sensor data or repetitively process the raw sensor data for purposes of discovering information about their users. These workflows are processor intensive and can take a significant amount of time to complete. There is very little leverage taking advantage of by the applications within the workflow, which means many applications perform a same or similar pass on the raw sensor data for substantially the same purposes.

These problematic workflows are particularly worrisome for insurance providers that rely on voluminous amounts of phone sensor data to evaluate their drivers/users. The raw sensor data for multiple devices received daily presents network bandwidth and processor throughput (response times) problems such that resources are frequently loaded and may be unavailable for other critical operations of the providers.

DETAILED DESCRIPTION

In various embodiments, methods and a system for providing and processing a features integration pipeline are provided. Raw sensor data is collected from operators of a mobile device, such as a phone, a wearable processing device, a tablet, etc. The raw sensor data may or may not include location data provided by a Global Positioning Satellite (GPS) module or Wi-Fi-based location services of the device. The raw sensor data is evaluated to identify trips during which the device was determined to be traveling within a vehicle, such as a car, a motorcycle, a boat, etc. Metadata for each trip's raw sensor data is separately maintained and indexed to the corresponding trip. The trip data (raw sensor data corresponding to a given trip) for each trip is staged and/or queued. Applications identify trips, obtain the corresponding trip data, and can process in parallel for purposes of normalizing the trip data. As trip data is normalized it is piped to feature enhancing applications (apps), each app evaluates the corresponding normalized trip data to determine whether a particular feature is to be associated with the corresponding trip. As features are determined from the feature enhancing apps, the features are piped to a feature integrator that generates and/or updates one or more trip level of granularity tables, feature level of granularity tables, and/or event level of granularity tables. The tables are housed in a feature store. The feature store is used as input to feature consuming apps and/or machine-learning models (MLMs), which, in an embodiment, update user attributes associated with users in a user data store.

The raw sensor data only requires a single pass by the feature enhancing apps and each different type of feature enhancing app can be processed in parallel with the remaining types of feature enhancing apps. This substantially improves response times for integrated features into trips of a user. The feature consuming apps always have a trip's features and events accessible via the feature store, such that additional passes on the raw sensor data is unnecessary, which substantially improves the processing throughput and response times of the feature consuming apps. Metadata is maintained separately and linked to the corresponding trip, such that the metadata is available when needed by the feature enhancing and feature consuming apps through a trip identifier associated with the raw sensor data ensuring that the metadata does not have to be recalculated and/or identified from the raw sensor data by the apps. The feature consuming apps can access the feature store for purposes of updating user-level attributes for the users within a user store.

As used herein, the terms "user," "insured," "driver," "operator," and "customer" may be used synonymously and interchangeably. This refers to an individual who possesses a mobile device, occasionally operates the mobile device, and has the mobile device while traveling in a vehicle.

The mobile device includes sensors, which produce sensor data, and the mobile device includes a mobile app that ensures the sensor data is maintained and periodically reported to the features integration pipeline system for integration of trip features and updating of user-level attributes for the users based on the features.

Figure 1:
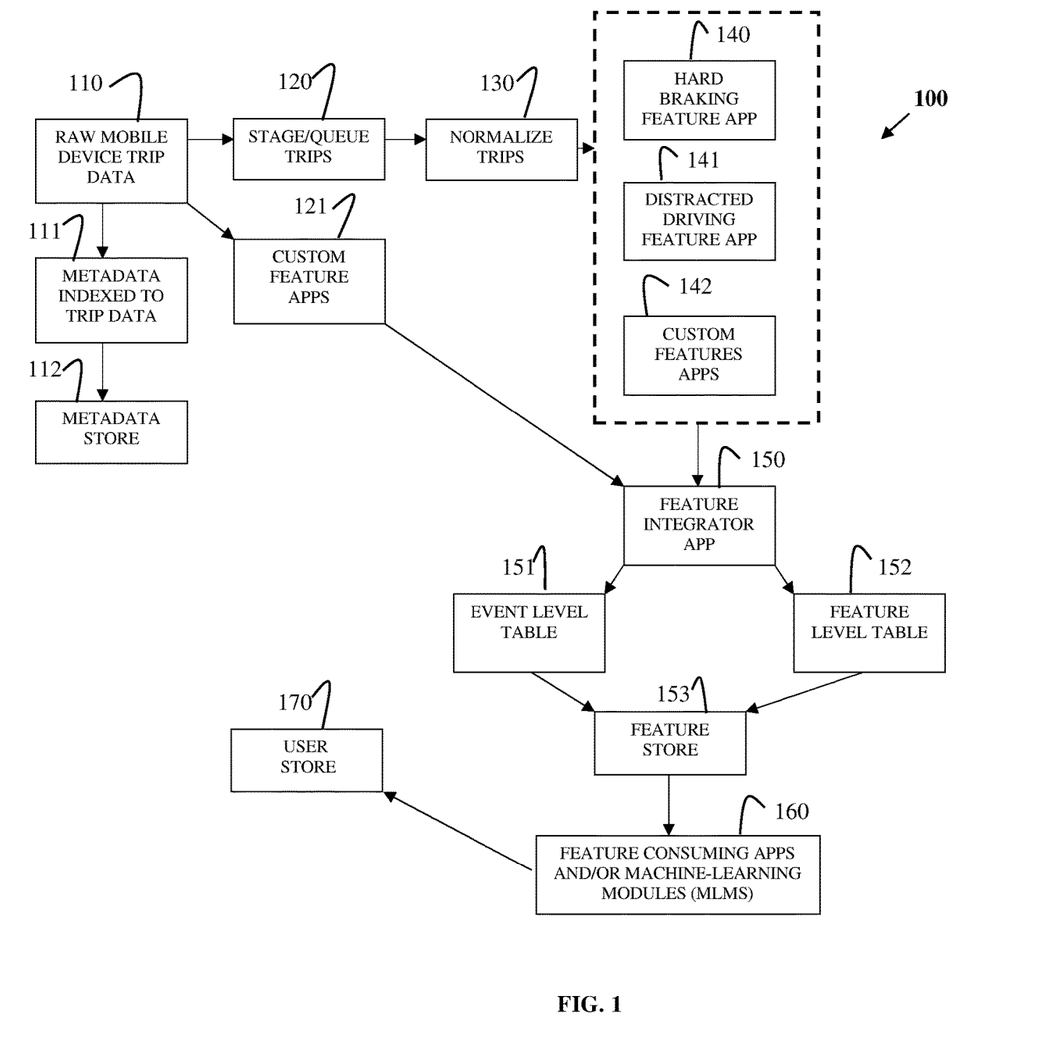
FIG. 1 is a diagram of a process flow for a features integration pipeline system, according to an example embodiment.

FIG. 1 is a diagram of a process flow 100 for a features integration pipeline system, according to an example embodiment. Processors of cloud 210 execute instructions (as discussed with system 200 of FIG. 2 below) to perform the operations discussed with process flow 100.

At 110, raw mobile device trip or trip sensor data is received and maintained in a sensor data store. At 111, metadata associated with a the trip data of each trip is determined or identified and indexed to the trip such as through a trip identifier associated with the corresponding trip data. The indexed metadata for the trip is maintained in a separate metadata store at 112.

A mobile device pushes sensor data to cloud/network-based storage and simultaneously sends a message to a server. The server fetches the sensor data from storage performs 111 and 112 (as discussed above) and stages the trip data for each trip as a job for the features integration pipeline system. At 120, the trip data for the trips are staged and/or queued as jobs to be processed. Normalization apps grab trips' data off the queues at 130; each set of trip data represents a trip and corresponds to a job that is to be processed through the features integration pipeline process flow 100. As a normalization app completes normalization on its corresponding raw trip data for a given job, the normalized trip data produced by the corresponding normalization app is piped to one or more feature enhancing apps. The feature enhancing apps evaluate the normalized trip data and associate features with the corresponding trip (by using the trip identifier).

In an embodiment, at 140 a feature enhancing app associates hard braking features that were detected in the corresponding normalized trip data with the corresponding trip; for example, features and feature values associated with a total number of hard brakes and a degree of each hard brake. In an embodiment, at 141 a feature enhancing app associates distracted driving feature values for distracted driving features with the corresponding trip; for example, features and feature values associated with a percentage of distracted driving time for the corresponding trip time as a whole; the percentage determined based on a set of predefined heuristics processed by the corresponding feature enhancing app. In an embodiment, at 142, a variety of custom features and feature values can be associated with the corresponding trip by custom feature apps.

In an embodiment, at 130, multiple instances of a normalized app can be processed in parallel or concurrently with one another to normalize trip data for a single trip. Each instance of a normalized app processes a unique and different portion of the corresponding trip data from the other instances. When a last of the instances completes, the corresponding normalized trip data from each of the instances is assembled and piped to the feature enhancing apps from the corresponding trip.

In an embodiment, multiple feature enhancing apps process within a single workflow. The corresponding normalized trip data is piped to the workflow and the workflow processes each of the feature enhancing apps apps for purposes of associating multiple features with the corresponding trip.

At 150, the trips and added features are piped when completed by the feature enhancing apps to a feature integrator app. Feature integrator process flow 100 maintains one or more granular level of detail tables for the trips as a whole and for each trip. By way of example process flow 100 shows an event-level table at 151 and a feature-level table at 152. An event-level table is maintained for each trip and the event-level table includes unique events as the rows and each event attribute as the columns. The feature-level table is maintained for the trips as a whole, each row associated with a unique trip and the columns of each row associated with the features. At 153, the tables are maintained, stored, accessed, and managed in a feature store.

Additionally, at 121, custom feature apps can process the raw trip data independently and send the trip events and features for a given trip identifier directly to the feature integrator app. Feature integrator app integrates the custom events and custom features into the corresponding tables at 151 and 152. Again, the event-level and feature-level tables are accessible from and maintained in a feature store at 153.

Figure 2:
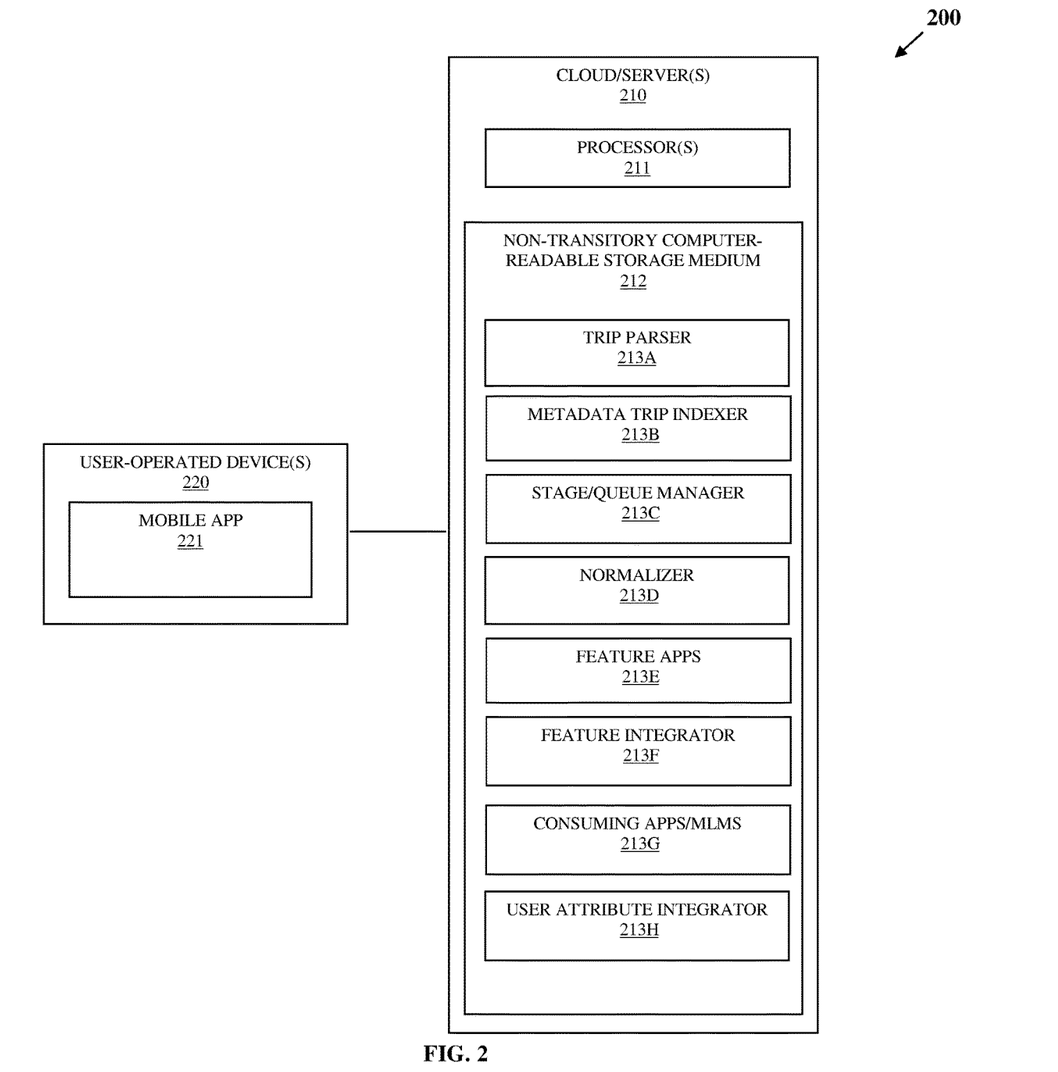
FIG. 2 is a diagram of the features integration pipeline system that performs the process flow of FIG. 1, according to an example embodiment.

FIG. 2 is a diagram of the features integration pipeline system 200 that performs the process flow 100 of FIG. 1, according to an example embodiment. It is to be noted that the components are shown schematically in greatly simplified form, with only those components relevant to understanding of the embodiments being illustrated. Furthermore, the various components (that are identified in the FIG. 2) are illustrated and the arrangement of the components is presented for purposes of illustration only. It is to be noted that other arrangements with more or with less components are possible without departing from the teachings of integrating data features by a features integration pipeline, presented herein and below.

System 200 includes a cloud 210 or a server 210 (hereinafter just "cloud 210") and one or more user-operated devices 220. Cloud 210 includes one or more processors 211 and non-transitory computer-readable storage/memory 212 (hereinafter just "medium 212"). Medium 212 includes executable instructions for a trip parser 213A, metadata trip indexer 213B, queue manager 213C, normalizer 213D, feature enhancing apps (hereinafter just "feature apps") 213E, feature integrator 213F, consuming apps/MLMs 213G, and user attribute integrator 213H, which when executed by processor(s) 211 cause processor(s) 211 to perform operations discussed herein and below with respect to 213A-213H. Medium 212 also include a raw trip data store, a metadata store, and a feature store as was discussed above with processor flow 100. Each user-operated device 220 includes a processor and a medium with executable instructions for a mobile application (hereinafter just "app") 221, which when executed by the corresponding processor cause the processor to perform operations discussed herein and below for app 221.

Initially, app 221 stores in a log or a file accelerometer data for device 220 as produced by the accelerometer of device 220. App 221 may also retain other raw sensor data such as gyroscope, compass, GPS coordinates, location data provided by location services of device 220. In an embodiment, app 221 does not retain any GPS coordinate data nor location data. At preconfigured intervals of time or upon a request from device trip parser 213A receives raw sensor data.

Trip parser 213A parses the raw sensor data for purposes of identifying the beginning and the ending of a trip where the user was in possession of the device 220 during the trip. Trip parser 213A detects characteristic signals in the raw sensor data to identify the beginning and the ending of a trip.

In an embodiment, app 221 determines the beginning and end of a trip from the raw sensor data. App 221 directly sends the raw sensor data for a trip directly to a data store on cloud 210. In an embodiment, an operating system (OS) of device 220 can identify a trip based on detected activity associated with device 220 such that app 221 can obtain the activity, record the sensor data, and provide trip data associated with each trip directly to the data store.

Metadata trip indexer 213B assigns a trip identifier for the corresponding raw sensor trip data (herein after just "trip data"). Indexer 213B associates metadata for the trip such as, and by way of example only, a user identifier for the user based on a mobile device identifier for the device 220 of the user, trip identifier, calendar date of trip, time of day, duration of the trip, and optionally a start location of the trip and end location of the trip (using location data when included in the trip data and/or GPS coordinates when included in the trip data). Again, it is noted that GPS coordinates and location data need not be available in the trip data. The metadata is indexed to the trip data and separately stored in a metadata store as was discussed above with process flow 100 at 112.

The trip data is then stored, staged, buffered, and/or queued by stage/queue manager 213C in a storage location or memory location and reference and/or link to that storage location or memory locations is associated with the trip identifier of the trip. The trip identifier is inserted into a job data structure along with the reference or the link to the corresponding trip data.

Normalizer 213D obtains the trip identifier and corresponding link or reference from the job data structure as a job to process. Normalizer 213D uses the link or reference to obtain the corresponding trip data for the trip and normalizes the trip data to identify data types. By way of example only, the data types can include data associated with yaw, pitch, surge, roll, sway, heave, gyroscope data types for orientation of the device 220, optionally data types associated with location data, optionally OS-provided activity data types, etc. In an embodiment, a device type for device 220 is used to identify the OS that is providing the trip data since Android® and iOS® may format and provide data values for data types in different formats.

In an embodiment, normalizer 213D can execute as multiple instances within cloud 210 as independent and concurrently processed instances. Each instance process a unique portion of the trip data for a given trip and normalizes the corresponding portion of the trip data. The normalized portions of trip data are assembled as normalized trip data and piped when completed by all of the instances to a memory or storage location accessible to the feature enhancing apps 213E. In an embodiment, different feature enhancing apps 213E can execute in parallel with remaining ones of the feature enhancing apps 213E; each feature enhancing app 213E accessing the storage or memory location and processing the normalized trip data simultaneously with one another (e.g., in parallel). In an embodiment, multiple feature enhancing apps 213E process within a single workflow, normalizer 213D pipes the normalized trip data to the workflow and the feature enhancing apps 213E process the normalized trip data in accordance with a process flow associated with the workflow. Each feature enhancing app 213E identifies events and features in the corresponding trip data and calculates or assigns event attributes for the events and feature values to the features for the normalized trip data. Some example features were discussed with process flow 100 above, such as total number of hard brakes and a degree of each hard brake, estimates of speeds during the trip, distracted driving values, etc. In an embodiment, one or more of the feature enhancing apps 213E is an MLM or utilizes an MLM to assign the features and corresponding feature values to the trip.

As each feature app 213E completes identifying events/features and assigning event attributes/feature values to the corresponding trip identifier, the corresponding trip identifier, events/features, event attributes/feature values are piped to the feature integrator 213F. Feature integrator 213F generates and/or updates one or more fine grain level of detail tables that correspond to the trip identifier with the events/features and corresponding event attributes/feature values.

In an embodiment, custom apps (discussed above with process flow 100 at 121) may simultaneously access the raw trip data and custom analyze and process the trip data to add and/or associate custom events/features and corresponding event attributes/feature values with the trip identifier within the tables. The trip identifier, the custom events/features, and the corresponding event attributes/feature values piped to feature integrator 213F by the custom apps and feature integrator 213F updates the corresponding tables.

The tables are accessible through a feature store to consuming apps/MLMs 213G. Apps/MLMs 213G always have access to updated events/features and their corresponding event attributes/feature values for any given trip such that apps/MLMs 213G do not have to access or process the raw trip data. The feature store along with the metadata store can be processed to obtain desired trips and their corresponding events, features, event attributes, feature values, and metadata for purposes of further analysis on a user-level of detail. Results of the analysis can result in updates being made to user-level attributes on a user data store (discussed with process flow 100 at 170) via user attribute integrator 213H.

For example, one or more first consuming apps 213G may process the tables from the feature store for purposes of updating feature values associated with hard braking, average speed, and/or distracting driving level attributes on a user record maintained for a user in the user data store through user attribute integrator 213H. One or more second consuming apps 213G may calculate a renewal rate of loss for the user based on the updated user-attribute levels at a predefined period of time before the user's renewal date. It is noted that is just one example, as a plethora of consuming apps/MLMs can take as input the events/features and corresponding event attributes/feature values from the tables for trips of a given user and update corresponding maintained user attributes on a user record within the user data store via attribute integrator 213H.

System 200 provides an integrated pipeline that can support multiple custom workflows, which rely on events/features and corresponding event attributes/feature values associated with trips of users. Each workflow has access to up-to-date trips and their corresponding events/features and assigned event attributes/feature values. There is no need to reprocess or access the corresponding raw trip data. The integrated pipeline also supports integration of custom apps that need or rely on access to the raw trip data by providing for integration of such custom events/features and custom assigned event attributes/feature values directly into the fine grain level of details tables of the feature store. Multiple portions of the pipeline can be processed in parallel while using a common accessible memory location or storage location as was discussed above. This substantially reduces load on resources of cloud 210 and improves throughput of processors 211 and application response times.

System 200 also does not have to rely on location data provided in the trip data but when location data is available within the trip data, the features/events and corresponding feature values/event attributes associated with the location data can be added to trips via the custom apps and/or via the feature enhancing apps 213E. The above-referenced embodiments and other embodiments are now discussed with reference to FIGS. 3-4.

Figure 3:
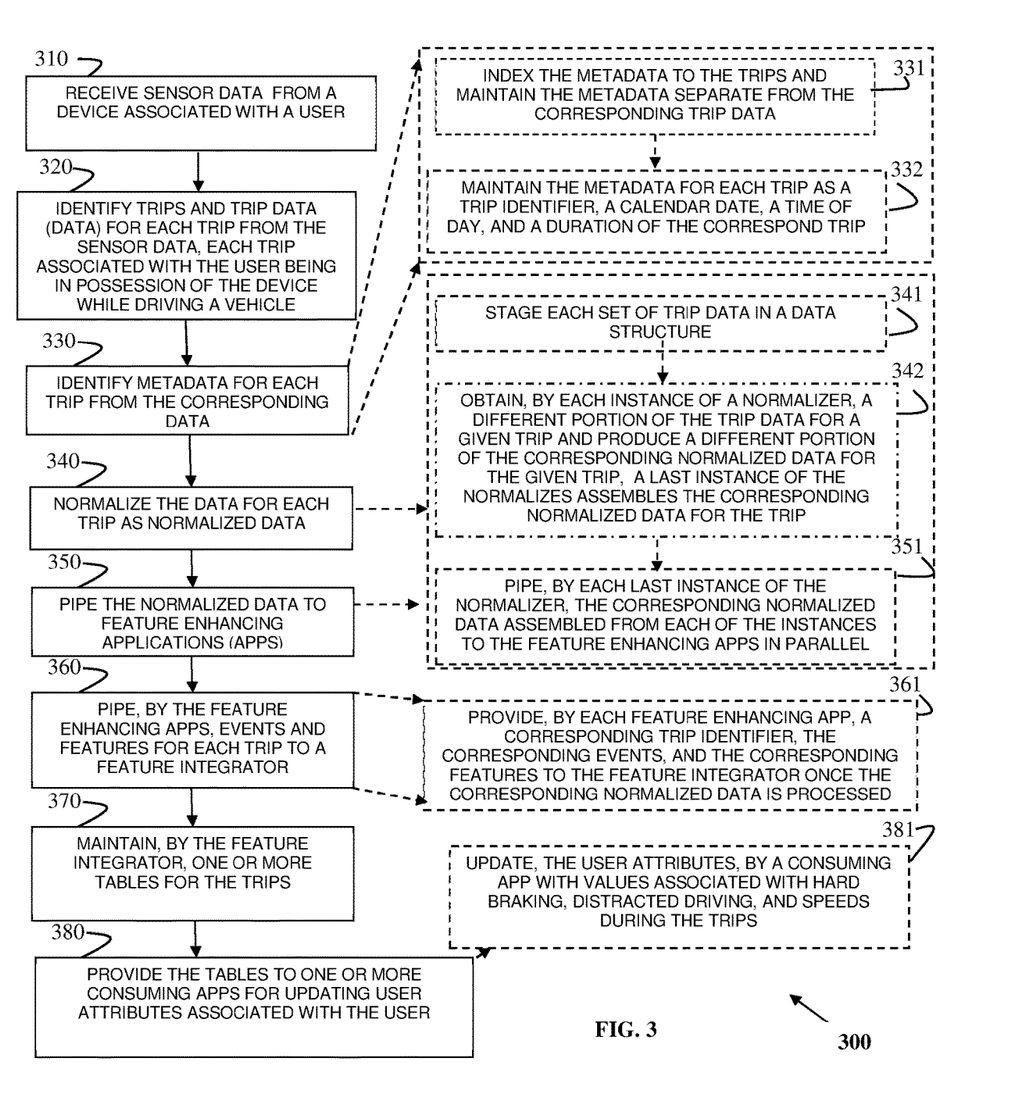
FIG. 3 is a flow diagram of a method for integrating data features by a features integration pipeline, according to an example embodiment.

FIG. 3 is a diagram of a method 300 for integrating data features by a features integration pipeline, according to an example embodiment. The software module(s) that implements the method 300 is referred to as a "feature integration pipeline." The feature integration pipeline is implemented as executable instructions programmed and residing within memory and/or a non-transitory computer-readable (processor-readable) storage medium and executed by one or more processors of one or more devices. The processor(s) of the device(s) that executes the feature integration pipeline are specifically configured and programmed to process the feature integration pipeline. The feature integration pipeline may have access to one or more network connections during its processing. The network connections can be wired, wireless, or a combination of wired and wireless.

In an embodiment, the device that executes the feature integration pipeline is the cloud 210. In an embodiment, the device that executes the feature integration pipeline is server 210.

In an embodiment, the feature integration pipeline is all or some combination of 213A, 213B, 213C, 213D, 213E, 213F, 213G, and/or 213H. The feature integration pipeline presents another and, in some ways, enhanced perspective of system 200 and/or process flow 100.

At 310, the feature integration pipeline receives sensor data from a device associated with a user. The sensor data, by way of example only, can include accelerometer data for an accelerometer of the device, gyroscope data for a gyroscope of the device, and location data or GPS data associated with location service sensors or GPS receivers of the device.

At 320, the feature integration pipeline identifies trips and trip data for each trip from the sensor data. Each trip associated with the user being in possession of the device while driving in a vehicle. By way of example only, a vehicle can include a car, a truck, a motorcycle, or a boat.

At 330, the feature integration pipeline identifies metadata for each trip from the corresponding trip data. In an embodiment, at 331, the feature integration pipeline indexes the metadata to the trips and maintains the metadata separate from the corresponding trip data. In an embodiment, at 332, the feature integration pipeline maintains the metadata for each trip as a trip identifier for the corresponding trip, a calendar date for the corresponding trip, a time of day for the corresponding trip, and a duration of the corresponding trip.

At 340, the feature integration pipeline normalizes the trip data for each trip producing normalized trip data. In an embodiment, each trip data for each trip normalized based on an operating system (OS) type associated with an OS of the device.

In an embodiment, at 341, the feature integration pipeline stages the trip data for each trip in a queue data structure (queue) within memory. In an embodiment, this can be an entry in the queue for a trip identifier and storage or memory location of its corresponding trip data.

In an embodiment of 341 and at 342, each instance of multiple instances of a normalizer processes in parallel to obtain different portions of the trip data for a given trip and produces a different portion of the corresponding normalized data for the given trip; each instance simultaneously accessing and using the queue. The different portions of the normalized data assembled as the normalized data for the given trip when a last processing instance finishes processing its portion of the trip data.

At 350, the feature integration pipeline pipes the normalized data to feature enhancing apps. The piping can be an API message that includes a trip identifier for a corresponding trip and a link to the corresponding normalized data. The API message can be simultaneously sent to multiple feature enhancing apps for processing the corresponding normalized data in parallel in parallel with one another and/or the API message can be sent to a workflow that includes a process flow for multiple feature enhancing apps that process the corresponding normalized data within the process flow.

In an embodiment of 342 and 350, at 351, each last instance of the normalizer pipes the corresponding normalized data assembled from each of the instances to each of the feature enhancing apps in parallel. Again, this can be via an API message that includes a trip identifier for the corresponding trip and a link to the assembled normalized data, which resides in storage or memory location and is simultaneously accessible from the storage or memory location by each of the feature enhancing apps, which process concurrently to one another.

At 360, the feature enhancing apps pipe events, features, assigned event attributes, and assigned feature values for each trip detected in the corresponding normalized data to a feature integrator. In an embodiment, at 361, each feature enhancing app provides a corresponding trip identifier, the corresponding events, features, assigned event attributes, and assigned feature values to the feature integrator once or as soon as the corresponding normalized data is processed.

At 370, the feature integrator maintains one or more event-level tables for the events and assigned event attributes and one or more feature-level tables for the features and assigned feature values.

At 380, the feature integration pipeline provides the one or more event-level tables and the one or more feature level tables to one or more consuming apps. The consuming apps process each trip with the event, features, event attributes, and feature values from the tables and updates user attributes associated with the user. The user attributes provide objective values with respect to the driving characteristics of the user.

In an embodiment, at 381, at least one consuming app updates the user attribute with values associated with hard braking, distracted driving and speeds during the trips.

Figure 4:
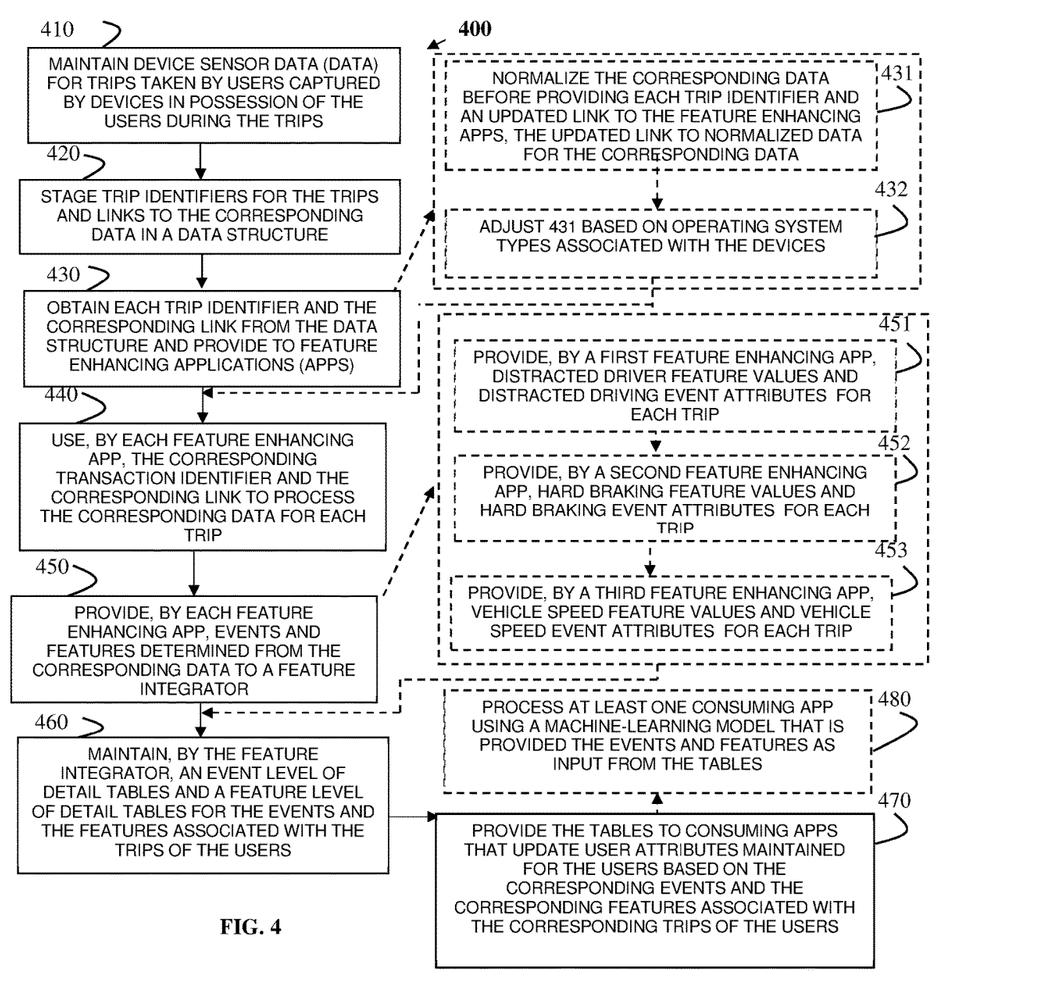
FIG. 4 is a diagram of another method for integrating data features by a features integration pipeline, according to an example embodiment.

FIG. 4 is a diagram of another method 300 for integrating data features by a features integration pipeline, according to an example embodiment. The software module(s) that implements the method 300 is referred to as a "features integrator." The features integrator is implemented as executable instructions programmed and residing within memory and/or a non-transitory computer-readable (processor-readable) storage medium and executed by one or more processors of one or more devices. The processors that execute the features integrator are specifically configured and programmed to process the features integrator. The features integrator may have access to one or more network connections during its processing. The network connections can be wired, wireless, or a combination of wired and wireless.

In an embodiment, the device that execute the features integrator is the cloud 210. In an embodiment, the device that executes the features integrator is server 210.

In an embodiment, the features integrator is all of, or some combination of 213A, 213B, 213C, 213D, 213E, 213F, 213G, 213H, and/or method 200. The features integrator presents another and, in some ways, enhanced processing perspective of system 200, process flow 100, and/or method 300.

At 410, the features integrator maintains device sensor data for trips taken by users. The device sensor data is captured by devices while in possession of the users within vehicles during the trips.

At 420, the features integrator stages trip identifiers for the trips and associates each trip identifier to the corresponding sensor data in a data structure.

At 430, the features integrator obtains each trip identifier and the corresponding link and provides to multiple feature enhancing apps simultaneously.

In an embodiment, at 431, the features integrator normalizes the corresponding sensor data and provides each trip identifier and an updated link to the feature enhancing apps. The updated link points to or references a memory or storage location for the normalized data associated with the corresponding sensor data for a given trip. In an embodiment, at 432, the features integrator adjusts the normalizing based on OS types associated with the devices of the users.

At 440, each feature enhancing app uses the corresponding transaction identifier and the corresponding link to process the corresponding sensor data for each trip and identifies, assigns, and associates events, event attributes for the events, features, feature values to each trip.

At 450, each feature enhancing app provides the corresponding events, event attributes, features, and feature values determined from the corresponding sensor data of a given trip to a feature integrator.

In an embodiment, at 451, a first feature enhancing app provides distracted driver feature values and distracted driver event attributes for each trip. In an embodiment, at 452, a second feature enhancing app provides hard braking feature values and hard braking event attributes for each trip. In an embodiment, at 453, a third feature enhancing app provides vehicle speed feature values and vehicle speed event attributes for each trip.

At 460, the feature integrator maintains event level of detail tables and feature level detail tables for the events and the features associated with the trips of the users.

At 470, the features integrator provides the tables to consuming apps. The consuming apps process the corresponding event attributes and feature values from the tables and update user attributes maintained for the users based on the corresponding event attributes and the corresponding feature values associated with the corresponding trips of the users.

In an embodiment, at 480, at least one consuming app uses an MLM that is provided the event attributes and the feature values as input and the MLM provides as output a value The outputted value can be assigned to a given user attribute or the output value can be further processed by the consuming app or another consuming app for purposes of deriving another value that is assigned to the given user attribute.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus, the following claims are hereby incorporated into the Description of the Embodiments, with each claim standing on its own as a separate exemplary embodiment.

The invention claimed is:

1. A method, comprising:
   receiving, by a at least one processor, sensor data from a device associated with a user;
   identifying, by the at least one processor, trips and trip data for each trip from the sensor data, each trip associated with the user being in possession of the device while driving a vehicle;
   identifying, by the at least one processor metadata for each trip from corresponding trip data, wherein the metadata comprises a trip identifier for a corresponding trip, a calendar data for the corresponding trip, a time of day for the corresponding trip, and a duration of the corresponding trip;
   normalizing, by the at least one processor, the trip data for each trip as normalized data;
      wherein multiple instances of a normalizer process in parallel to obtain different portions of the trip data for a given trip and produces different portions of normalized data for the given trip, and wherein a last instance assembles the different portions as the normalized data when completed;
   piping, by the at least one processor, the normalized data to applications (apps), wherein each app comprises app executable instructions which are executed by the at least one processor;
   piping, by the apps, events and features for each trip to a feature integrator, wherein the feature integrator comprises feature integrator executable instructions which are executed by the at least one processor;
   maintaining, by the feature integrator, one or more event-level of detail tables and one or more feature-level of detail tables for the trips; and
   providing, by the at least one processor, the one or more event-level of detail tables and the one or more feature-level of detail tables to one or more consuming apps for updating user attributes associated with the user.

2. The method of claim 1, wherein identifying the metadata further includes indexing the metadata to the trips and maintaining the metadata separate from the corresponding trip data.

3. The method of claim 1, wherein receiving further includes receiving the sensor data at predefined intervals of time from the device.

4. The method of claim 1, wherein normalizing further includes staging the trip data for each trip in a data structure.

5. The method of claim 4, wherein staging further includes obtaining, by each instance of a plurality of instances of a normalizer, a different portion of the trip data for a given trip using the data structure, the plurality of instances process in parallel with one another to produce corresponding normalized data for the given trip, wherein each instance of the normalizer comprises normalizer executable instructions which are executed by the at least one processor.

6. The method of claim 5, wherein piping the normalized data further includes piping, by each last instance of the normalizer, the corresponding normalized data for the given trip assembled from each of the plurality of instances to the apps in parallel.

7. The method of claim 1, wherein piping by the apps further includes, providing, by each app, a corresponding trip identifier, corresponding events, and corresponding features to the feature integrator once corresponding normalized data is processed.

8. The method of claim 1, wherein providing further includes updating the user attributes, by at least one consuming app, with values for the user associated with hard braking, distracted driving, and speeds during the trips based on the events and the features associated with the trips.

9. A method, comprising:
   maintaining, by at least one processor device sensor data for trips taken by users captured by devices in possession of the users during the trips;

staging, by the at least one processor, trip identifiers for the trips and links to corresponding device sensor data in a data structure;

obtaining, by the at least one processor, each trip identifier and a corresponding link from the data structure and providing to applications (apps) that process in parallel, wherein each app comprises app executable instructions which are executed by the at least one processor; wherein the apps simultaneously access raw trip data and custom analyze the raw trip data to add custom events and custom features with corresponding custom event attributes and custom feature values;

using, by each app, a corresponding trip identifier and the corresponding link to process the corresponding device sensor data for each trip;

providing, by each app, events and features determined from the corresponding device sensor data to a feature integrator, wherein the feature integrator comprises feature integrator executable instructions which are executed by the at least one processor;

maintaining, by the feature integrator, an event level of detail tables and feature level of detail tables for the events and the features associated with the trips of the users; and providing the event level of detail tables and the feature level of detail tables to consuming apps that update user attributes maintained for the users based on corresponding events and corresponding features associated with corresponding trips of the users.

10. The method of claim 9, wherein staging further includes normalizing the corresponding device sensor data before providing each trip identifier and an updated link to the apps, the updated link to normalized data for the corresponding device sensor data.

11. The method of claim 10, wherein normalizing further includes adjusting data normalization based on operating systems of the devices.

12. The method of claim 9, wherein providing by each app further includes providing, by a first app, distracted driving feature values and distracted driving event attributes for each trip.

13. The method of claim 12, wherein providing by each app further includes providing, by a second app, hard braking feature values and hard braking event attributes for each trip.

14. The method of claim 13, wherein providing by each app further includes providing, by a third app, vehicle speed feature values and vehicle speed event attributes for each trip.

15. The method of claim 9, wherein providing the event level of detail tables and the feature level of detail tables further includes processing at least one consuming app using a machine-learning model (MLM) that is provided the events and the features as input from the event level of detail tables and the feature level of detail tables.

16. A system, comprising:
at least one server system comprising at least one server having at least one processor and a non-transitory computer-readable storage medium having executable instructions;
the executable instructions when executed by the at least one processor from the non-transitory computer-readable storage medium causes the at least one processor to perform operations comprising:
identifying metadata for trips from sensor data associated with the trips of users, wherein the sensor data collected from sensors of devices that the users have while traveling in vehicles during the trips, wherein the metadata comprises a trip identifier for a corresponding trip, a calendar data for the corresponding trip, a time of day for the corresponding trip, and a duration of the corresponding trip;
indexing the metadata and linking to corresponding sensor data for corresponding trips in a metadata store;
staging each the sensor data for each trip;
wherein multiple portions of a pipeline are processed in parallel while using a common accessible memory location, which substantially reduces load on resources and improves throughput of the at least one processor and application response times;
obtaining, by instances of normalizers, the sensor data and normalizing the sensor data in parallel as normalized data for each trip, wherein each instance of the normalizers comprises normalizer executable instructions which are executed by the at least one processor;
providing, by a last processing instance of the normalizers, corresponding normalized data for each trip to applications (apps), wherein the apps include app instructions which are executed by the at least one processor;
associating, by each app, features and events to the normalized data corresponding to a particular trip of a particular user;
providing, by each app, corresponding features and corresponding events to a feature integrator, wherein the feature integrator comprises feature integrator executable instructions which are executed by the at least one processor;
maintaining, by the feature integrator, the events in one or more event level of detail tables and the features in one or more feature level of detail tables and a features table for the trips in a feature store;
processing, by consuming apps, the feature store utilizing the events and the features of the one or more event level of detail tables and of the one or more feature level of detail tables to update user attributes associated with the users with driving characteristic values or factors based on the trips.

17. The system of claim 16, wherein the devices are phones or tablets.

18. The system of claim 16, wherein the operations further comprise:
using, by the apps and by the consuming apps, the metadata associated with each trip that is maintained in the metadata store.

19. The system of claim 16, wherein the operations associated with the staging by the instances of the normalizers further include normalizing, by each instance of the normalizers, the corresponding sensor data based on operating systems of the devices.

* * * * *